(12) United States Patent
Alam et al.

(10) Patent No.: US 11,979,374 B2
(45) Date of Patent: *May 7, 2024

(54) LOCAL NETWORK DEVICE CONNECTION CONTROL

(71) Applicant: Cujo LLC, Walnut, CA (US)

(72) Inventors: Syed Alam, Mississauga (CA); Chris Griffiths, Philadelphia, PA (US); Santeri Kangas, Kirkkonummi (FI)

(73) Assignee: Cujo LLC, Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,760

(22) Filed: Apr. 17, 2023

(65) Prior Publication Data
US 2023/0254281 A1 Aug. 10, 2023

Related U.S. Application Data

(63) Continuation of application No. 17/499,986, filed on Oct. 13, 2021, now Pat. No. 11,700,235.

(51) Int. Cl.
*H04L 9/40* (2022.01)
*H04L 61/4511* (2022.01)

(52) U.S. Cl.
CPC ...... *H04L 63/0236* (2013.01); *H04L 61/4511* (2022.05); *H04L 63/0263* (2013.01); *H04L 63/166* (2013.01)

(58) Field of Classification Search
CPC ............. H04L 63/0236; H04L 61/4511; H04L 63/0263; H04L 63/166; H04L 63/0428; H04L 63/1416; H04L 63/1425; H04L 63/1441; H04L 63/1483; G06F 21/554

See application file for complete search history.

(56) References Cited

U.S. PATENT DOCUMENTS

| 9,219,717 | B2 * | 12/2015 | Gupta | .............. H04L 61/5076 |
| 2020/0106806 | A1 * | 4/2020 | Gupta | .............. H04L 61/4511 |
| 2020/0314107 | A1 | 10/2020 | Joshi et al. | |

(Continued)

FOREIGN PATENT DOCUMENTS

WO 2016209756 A1 12/2016

OTHER PUBLICATIONS

Extended European Search Report for European Patent Application No. 22193858.2 dated Feb. 23, 2023, 7 pages.

(Continued)

*Primary Examiner* — Amie C. Lin
(74) *Attorney, Agent, or Firm* — Dority & Manning, P.A.

(57) ABSTRACT

There is provided a method comprising receiving a domain name system (DNS) query from a client computing device, decrypting the DNS query by a DNS resolver device, and requesting reputation information related to the FQDN from an agent device of the router apparatus. If a matching FQDN is not found in a local database, the DNS query is allowed to proceed from the DNS resolver device to a cloud DNS resolver, the IP and MAC address of the client computing device are logged and mapped to the local database, the reputation information related to the FQDN is requested from a cloud FQDN server, and if the reputation information indicates that the FQDN should be blocked, the local database is updated with the reputation information and further queries to the FQDN are blocked.

21 Claims, 6 Drawing Sheets

(56) References Cited

U.S. PATENT DOCUMENTS

2021/0136037 A1     5/2021  Balasubramaniam
2021/0160237 A1*    5/2021  Rozner ................. H04L 9/3213
2021/0226918 A1*    7/2021  Ossipov .............. H04L 63/0236

OTHER PUBLICATIONS

Notice of Allowance for U.S. Appl. No. 17/499,986, dated Jan. 20, 2023, 13 pages.
Office Action for Canadian Patent Application No. 3,175,335 mailed Jan. 15, 2024, 7 pages.

* cited by examiner

LOCAL NETWORK DEVICE CONNECTION CONTROL

RELATED APPLICATION

This application is a continuation of co-pending U.S. patent application Ser. No. 17/499,986, filed on Oct. 13, 2021, entitled "LOCAL NETWORK DEVICE CONNECTION CONTROL," which is hereby incorporated herein by reference in its entirety.

TECHNICAL FIELD

The present application relates generally to network security, and specifically to controlling connections of client computing devices of a local network with or without DNS encryption.

BACKGROUND

A fully qualified domain name (FQDN) is a complete domain name for a computer device, or host, on the Internet. FQDN enables each network entity connected to the Internet to be identified and located in the network. This is useful in many ways such as, for example, to provide security, parental control and privacy services, maintenance of the network and managing subscribers to the network.

It can be desirable to find efficient methods to categorize end user FQDNs.

SUMMARY

According to an aspect of the invention there are provided methods as specified in the claims.

According to other aspect of the invention, there are provided apparatuses in a computer network system as specified in the claims.

According to other aspect of the invention, there is provided a non-transitory computer-readable medium comprising stored program code, the program code comprised of computer-executable instructions that, when executed by a processor, causes the processor to operate as specified in the claims.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
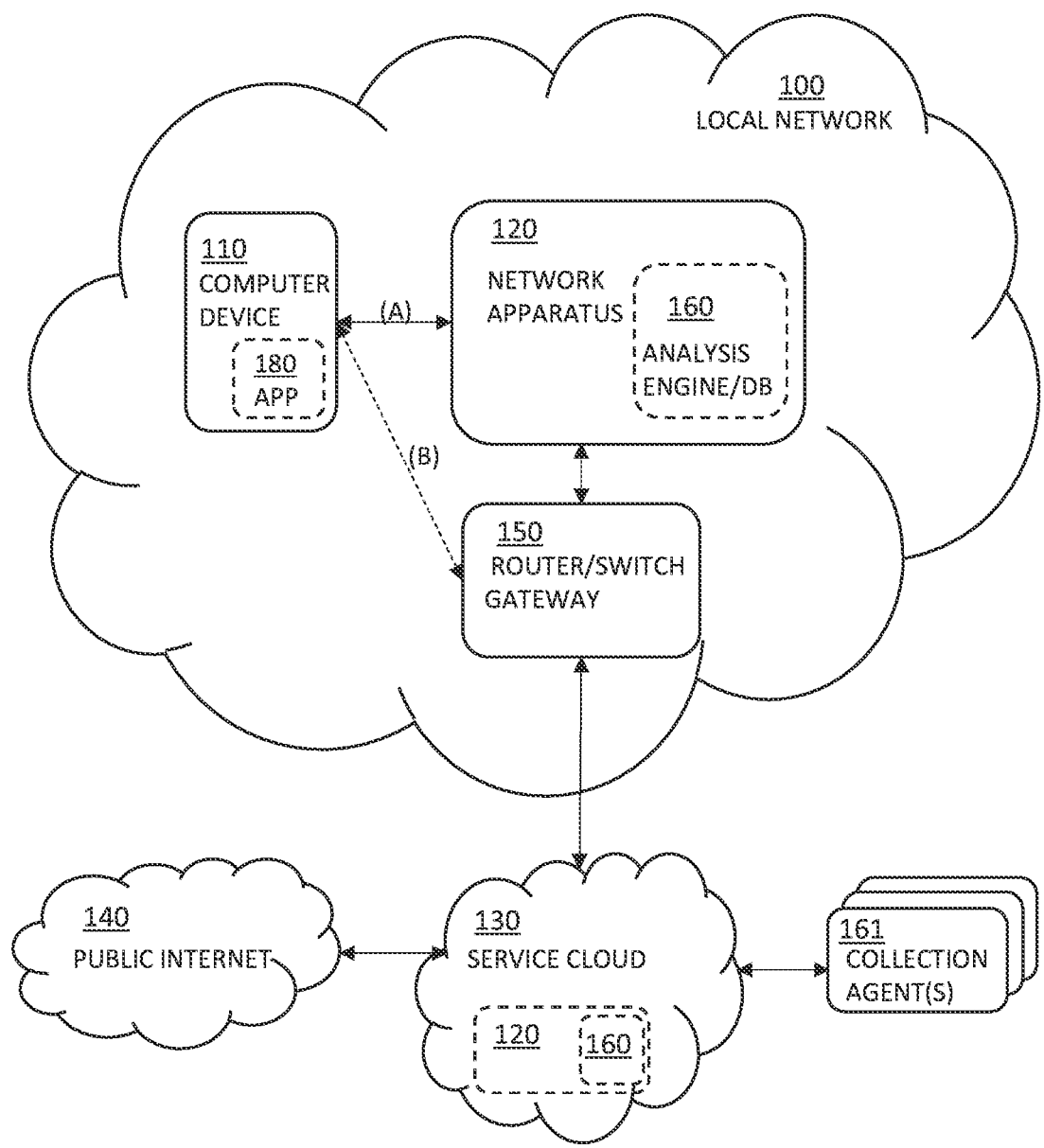
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more devices 110 with a client application 180, the network apparatus 120, a local router/switch 150, and an analysis engine 160. The example system also includes a service cloud 130, such as a network operator's cloud, the Internet 140, and a plurality of data collection agents 161. The analysis engine 160 may reside in the local network, in the service cloud 130 or elsewhere in the network. There may also be more than one analysis engines 160 thus enabling at least part of the analysis being processed in more than one analysis engines. The data collection agents 161 may reside anywhere in the network and may communicate directly or non-directly with the service cloud 130, apparatus 120 and/or the analysis engine/database 160 or be part of any other entity in the network. A collection agent 161 can be any apparatus/device capable of collecting data related to one or more devices 110. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The user device(s) 110 may also be configured to use the services provided by the service cloud 130 by one or more applications 180 installed on the device(s) 110.

The device 110 may be any computer device having Internet browsing capabilities, such a smartphone, laptop, or a tablet. The network apparatus 120 collects information, e.g., about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signaling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the collection agents(s) 161 and/or the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more computing devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the router 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

In line network devices may require domain name system (DNS) query and response to enable services they offer. DNS traffic may be transmitted non-encrypted enabling network devices to inspect the DNS transaction and retrieve required information, such as extracting the FQDN for end users. However, in case DNS queries and the server name indication (SNI) portion of the HTTPS handshake are encrypted, then the possibility to extract FQDN directly from the HTTPS handshake becomes impossible and service providers are not able to understand what FQDN is being accessed over the Internet by intercepting and inspecting DNS traffic. Further, as DNS over hypertext transfer protocol (HTTPS)(DOH) or DNS over transport layer security (TLS)(DOT) becomes more prevalent on the Internet, this will cripple services offered by in line devices that require DNS query/response information.

As the Internet constantly changes, stronger computing systems are required to constantly evaluate Internet FQDN categorization. There is a balance of the time required for evaluation vs negatively impacting the customer experience.

The embodiments of the invention enable inspecting the DNS traffic and sending data to backend cloud system for analysis in an efficient manner. This evaluation may be done in an offline manner to not impact the customer experience. An embodiment of the invention enables reducing the time on a same subsequent query analysis by updating a local cache to identify an action, such as blocking a specific FQDN.

The embodiments of the invention enable alternative ways for network service providers (NSPs) to offer DNS over HTTPs or DNS over TLS while still having the ability to log DNS queries for additional service requirements and DNS firewalling capability at the customer premises equipment (CPE) router, for example. The embodiments of the invention also enable solving problems related to encrypted SNI portions of HTTPS handshakes that prevent service providers to track end user FQDSs. The embodiments of the invention offer solutions to both DOH and SNI problems.

Figure 2:
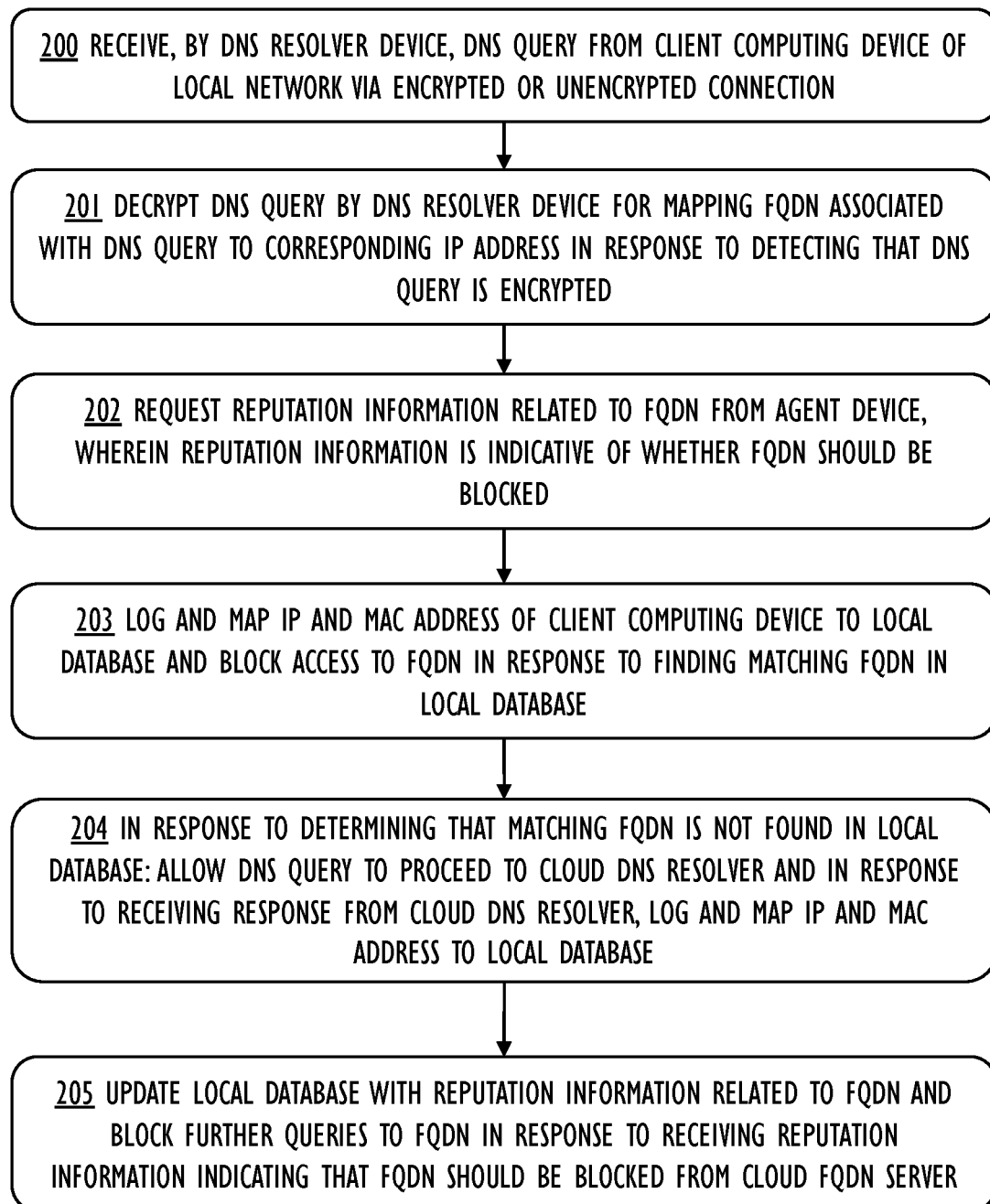
FIG. 2 illustrates a flowchart of a method, according to one embodiment.

FIG. 2 is a flow diagram illustrating an embodiment of a method.

In 200, a DNS query is received by a DNS resolver device of a router apparatus of a local computer network. The DNS query is associated with a FQDN. The DNS query may be received via an encrypted connection. In an embodiment, the DNS resolver device on the router apparatus may be a DOH/DOT front end for a customer with a capability to log DNS traffic.

In 201, in response to the DNS query being encrypted, the DNS query is decrypted by the DNS resolver device for mapping the FQDN associated with the DNS query to a corresponding internet protocol (IP) address.

In 202, the DNS resolver device requests reputation information related to the FQDN from an agent device of the router apparatus, wherein the reputation information is indicative of whether the FQDN should be blocked.

In 203, in response to the agent device finding a matching FQDN in a local database, the IP address and a medium access control (MAC) address of the client computing device is logged and mapped to the local database and access of the client computing device is blocked to the FQDN.

In 204, in response to the agent device determining that the matching FQDN is not found in the local database, the local DNS resolver device allows the DNS query to proceed from the DNS resolver device to a cloud DNS resolver of a network service provider, and in response to receiving, at the agent device, a response from the cloud DNS resolver, the agent device logs and maps the IP address and the MAC address of the client computing device to the local database.

In 205, the agent device requests the reputation information related to the FQDN from a cloud FQDN server, and in response to receiving the reputation information indicating that the FQDN should be blocked from the cloud FQDN server, updates the local database with the reputation information related to the FQDN and blocks further queries to the FQDN.

In an embodiment, outgoing network traffic of the client computing device to the IP address is blocked based on the received reputation information related to the FQDN.

In an embodiment, access of a further client computing device to the same FQDN is blocked based on the reputation information related to the FQDN in response to receiving a further DNS query to the same FQDN in the local database.

In an embodiment, the DNS query is re-encrypted before passing the DNS query from the local DNS resolver device to the cloud DNS resolver in case the DNS query was decrypted after receiving the DNS query from the client computing device.

In an embodiment, the DNS resolver device sends a response to the DNS query to the client computing device.

In an embodiment, the agent device determines a device identification of the client computing device and controls access of the client computing device to the FQDN based on the device identification.

In an embodiment, outbound communication to the Internet from the client computing device can be limited. For example, one or more outbound IP addresses may be blocked based on the blocked FQDN and the device IP and MAC address pair. Outbound IP addresses refer to addresses what other devices/services would see if the client computing device makes an outbound connection request. There can be a set of outbound IP addresses in use to allow more simultaneous connections and an embodiment of the invention enables blocking these outbound connections by the outbound IP addresses.

In an embodiment, the DNS resolution is performed via hypertext transfer protocol (HTTPS) or transport layer security (TLS).

In an embodiment, a predetermined time to live (TTL) is set for caching the DNS query before causing the client computing device to resend the DNS query in case the reputation information from the cloud FQDN server has not been received.

In an embodiment, further action is taken to protect one or more client computing devices of the local computer network, wherein the further action comprises one or more of: reporting a security related incident, blocking or preventing access to the FQDN, preventing communication of the client computing device, providing security, parental control, or privacy protection measures, and applying other security measures to protect the local network and/or the one or more computing devices.

Figure 3:
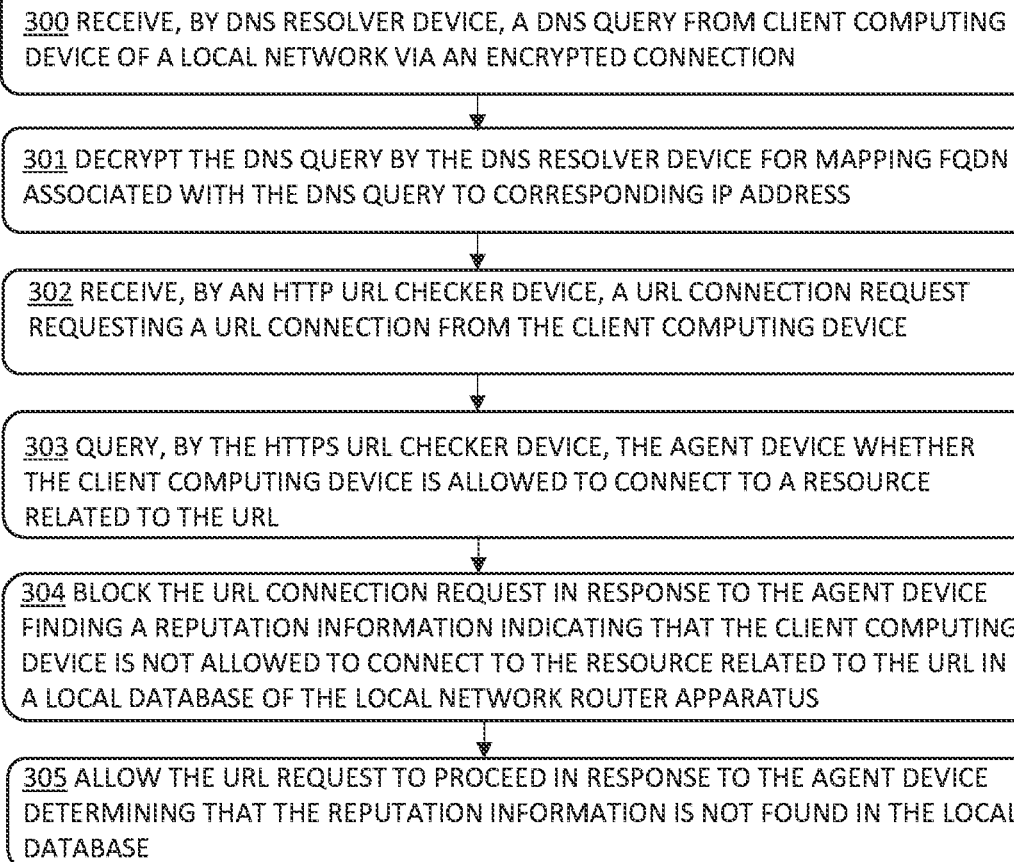
FIG. 3 illustrates a flowchart of a method, according to one embodiment.

FIG. 3 is a flow diagram illustrating another embodiment of a method.

In 300, a DNS query is received by a DNS resolver device of a router apparatus of a local computer network. The DNS query is associated with a FQDN. The DNS query may be received via an encrypted connection.

In 301, in response to the DNS query being encrypted, the DNS query is decrypted by the DNS resolver device for mapping the FQDN associated with the DNS query to a corresponding internet protocol (IP) address.

In 302, a uniform resource locator (URL) checker device of the local network router apparatus receives a URL connection request requesting a URL connection from the client computing device.

In 303, the URL checker device queries an agent device of the router apparatus whether the client computing device is allowed to connect to a resource related to the URL.

In 304, in response to the agent device finding reputation information indicating that the client computing device is not allowed to connect to the resource related to the URL in a local database, the URL connection request is blocked.

In 305, in response to the agent device determining that the reputation information is not found in the local database, the URL connection request is allowed to proceed.

In an embodiment, the local DNS resolver device allows the DNS query to proceed from the DNS resolver device to a cloud DNS resolver of a network service provider before receiving a response from the agent device related to the query. In an embodiment, the requested URL connection is blocked until the response from the agent device related to the query is received.

In an embodiment, blocking the URL connection is further based on a device identification of the client computing device.

In an embodiment, it is possible to track a specific network connection, for example, over port 443 by the destination IP address that is being accessed. A map or a chart can be generated that has a tuple of IP address and associated URL reputation check result based on the FQDN determination. If the verdict from the URL reputation check result is negative, then blocking decision is made. Thus, blocking outgoing IP addresses based on the received results from the URL checker is enabled.

In an embodiment, a response to the URL check is awaited (a DNS request may be allowed to pass after a predetermined timeout period). It is beneficial to track which client computing device and which IP address is related to a specific DNS in question. Based on the reputation check results, an IP address may be blocked from outgoing network traffic. Thus, protecting the client computing device is enabled. Based on detecting that a client computing device and its associated DNS IP address has a negative verdict from the URL checker, outgoing IP address may be blocked. This requires knowing the MAC and the IP addresses related to the client computing device. A blocking decision may be made based on a received negative verdict from the URL checker thus enabling blocking outgoing IP addresses based on the received results from the URL checker.

One or more mapping models can be generated that map FQDNs and/or IP addresses to the related reputations thereof. An example mapping model may use various data attributes extracted from the network traffic and associate them with the reputations results.

Figure 4:
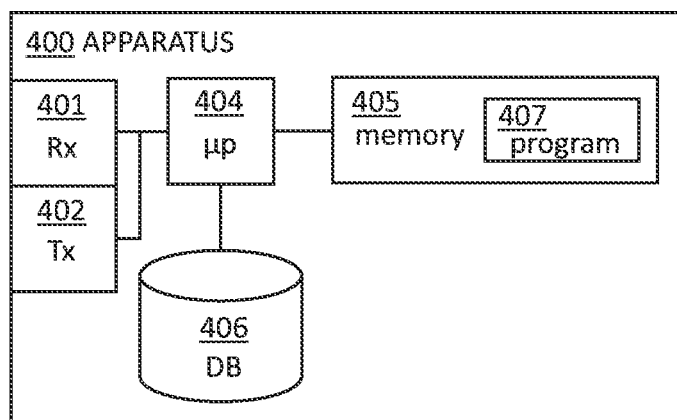
FIG. 4 is a block diagram of an apparatus, according to one embodiment.

Turning now to FIG. 4 that is showing an example of a network apparatus.

A processor 404 is provided that is configured to detect connection requests relating to monitored network traffic passing through the network apparatus. Further, the processor 404 is configured to receive a domain name system (DNS) query from a client computing device of the local computer network, wherein the DNS query is associated with a fully qualified domain name (FQDN), and to decrypt the DNS query for mapping the FQDN associated with the DNS query to a corresponding internet protocol (IP) address in response to the DNS query being encrypted.

In an embodiment, the processor 404 is further configured to request a reputation information related to the FQDN from a local database, wherein the reputation information is indicative of whether the FQDN should be blocked, to log and map the IP address and a medium access control (MAC) address of the client computing device to the local database and to block access of the client computing device to the FQDN in response to finding a matching FQDN in the local database. The processor 404 is further configured to allow the DNS query to proceed from the local computer network to a cloud DNS resolver of a network service provider, log and map the IP address and the MAC address of the client computing device to the local database in response to receiving a response from the cloud DNS resolver, request reputation information related to the FQDN from a cloud FQDN server, and update the local database with the reputation information related to the FQDN in response to determining that a matching FQDN is not found in the local database. The one or more processor devices are further configured to block further queries to the FQDN in response to receiving the reputation information indicating that the FQDN should be blocked from the cloud FQDN server.

In an embodiment, the processor 404 is further configured to receive a URL connection request from the client computing device, determine whether the client computing device is allowed to connect to a resource related to the URL based on reputation information in a local database of the local computer network, and block the URL connection request in response to finding a reputation information indicating that the client computing device is not allowed to connect to the resource related to the URL in a local database. The processor 404 is further configured to allow the URL connection request to proceed in response to the agent device determining that the reputation information is not found in the local database.

In an embodiment, the processor 404 is further configured to store extracted data and any reputation data to the database 406. The database 406 is shown in this example as being located at the apparatus 400, but it will be appreciated that the apparatus 404 may also access a remote database. The database 404 may comprise necessary data collected from the network traffic data related to client computing devices.

In the above description, the apparatus 400 is described as having different transmitter 402 and receiver 401. It will be appreciated that these may be disposed in any suitable manner, for example in a single transmitter and receiver, a transceiver and so on. Similarly, a single processor 404 is described but it will be appreciated that the function of the processor may be performed by a single physical processor or by more than one processor.

The apparatus 400 is also provided with a non-transitory computer readable medium in the form of a memory 405. The memory may be used to store a computer program 407 which, when executed by the processor 400, causes the processor 404 to perform the functions described above. The computer program 407 may be provided from an external source. In an embodiment, at least some or even all of the functions of the method can be implemented in any apparatus, for example the user device or a server.

Figure 5:
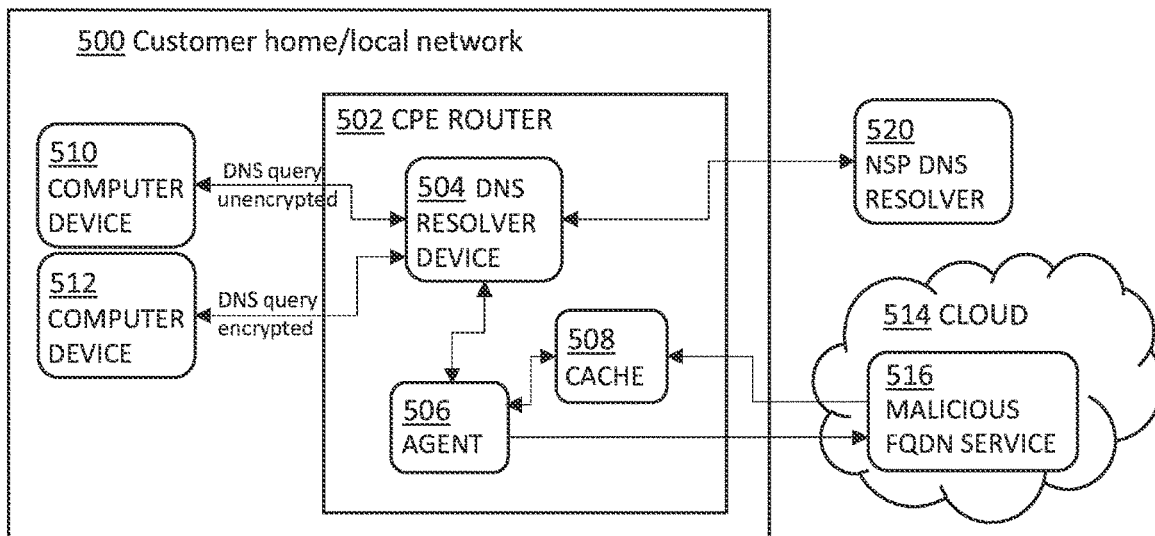
FIG. 5 is a block diagram of an example of a system environment, according to one embodiment.

Turning now to FIG. 5 that is illustrating schematically another example of a system environment.

The system environment illustrated in FIG. 5 includes a customer home or a local network 500 that includes one or more computer devices 510, 512 and a local router 502. The local router 502 further comprises also a DNS resolver 504, a local agent device 506 and a local cache/database 508. The computer devices 510, 512 may comprise any number of client applications. The example system also includes a service cloud 514 comprising any number of service modules and/or models for analysing/detecting malicious FQDNs based on received data from any number of local networks 500.

The local router 502 collects network traffic data from the local network 500. The DNS resolver 504 agent on the local router 502 may be a DOH/DOT front end for the customer with a capability to log DNS traffic. DNS queries are sent from the computer devices 510, 512 to the DNS resolver 504. The DNS query may be unencrypted or encrypted. In response to detecting that the received DNS query is encrypted, the DNS query is decrypted by the router 502. The DNS resolver 504 queries the local agent 506 whether the FQDN associated with the DNS query should be blocked. The local agent 506 queries the local block cache 508 for a matching FQDN.

Case 1: if there is a matching FQDN in the local block cache 508, the local agent 506 will log and map the source computer device IP and MAC address, making the query to the local cache, and will reply to the local DNS resolver 504 to reply to the computer device 510, 512 that the domain does not exist. Further, the local agent 506 will send the non-cached FQDN to upstream cloud malicious FQDN service 516 for analysis.

Case 2: If no matching FQDN is found in the local block cache, then the local agent 506 will reply to the local DNS resolver 504 that there was no match. The local DNS resolver 504 will pass the query to upstream network service provider (NSP) DNS resolver 520. If the DNS query was initially encrypted, the local DNS resolver 504 will re-encrypt the query and pass it to the upstream DNS resolver 520. When the local DNS resolver 504 receives a reply from the NSP DNS resolver 520, it will instruct the local agent 506 to log and map the source computer device's IP and MAC address making the query to the local cache 508. The local agent 506 sends the non-cached FQDN to upstream cloud malicious FQDN service 516 for analysis.

In an embodiment, if after cloud analysis, the FQDN is evaluated to be blocked, the cloud 514 sends an instruction to the local agent 506 to update the local cache 508 with the FQDN reputation information such that any subsequent queries to the same FQDN will be blocked. This process may apply to all managed CPEs which allow for discovery from one device and apply protection to many. The DNS firewall response policy zone (RPZ) rule may also be updated if the domain is determined to be malicious. Thus, any subsequent query to the same FQDN will match on the local cache immediately.

Figure 6:
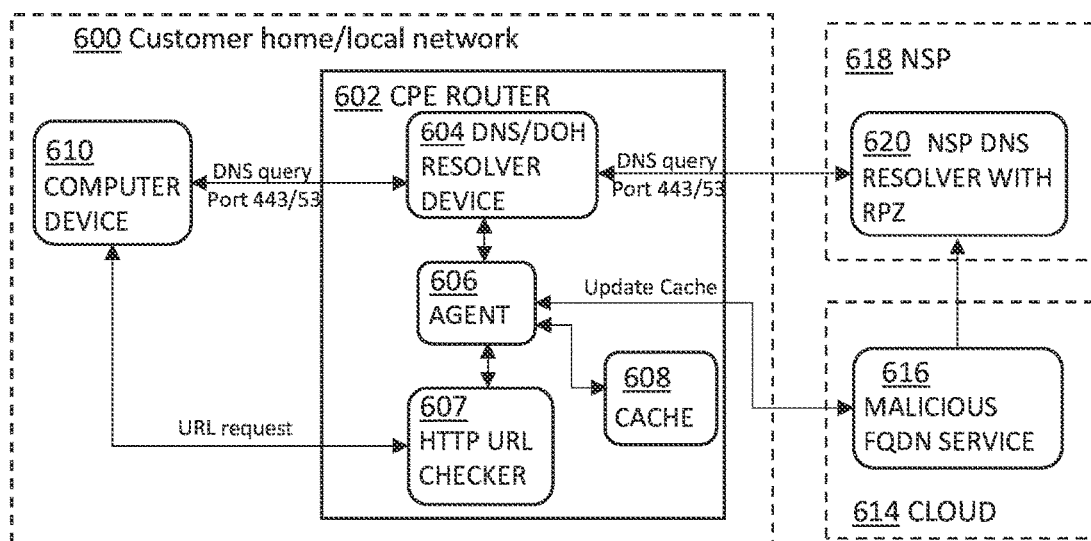
FIG. 6 is a block diagram of another example of a system environment, according to one embodiment.

Turning now to FIG. 6 that is illustrating schematically another example of a system environment.

The system environment illustrated in FIG. 6 includes a customer home or a local network 600 that includes one or more computer devices 610 and a local router 602. The local router 602 further comprises also a DNS resolver 604, a local agent device 606, an HTTPS URL checker 607 and a local cache/database 608. The example system also includes a service cloud 614 comprising any number of service modules and/or models for analysing/detecting malicious FQDNs 616 based on received data from any number of local networks 600. Further, the example system also includes a network services provider's service cloud 618 comprising an NSP DNS resolver with an RPZ (DNS response policy zones) 620. DNS RPZ is a method allowing a nameserver administrator to overlay custom information on top of the global DNS to provide alternate responses to queries. It enables implementing own protection policies based on reputation feeds from security service providers 614 on a near-real-time basis.

In an embodiment, a URL request is sent from the computer device 610 to the HTTP URL checker 607. The HTTP URL checker 607 queries the local agent 606 whether the computer device 610 is allowed to connect to the requested domain. The agent 606 will query the local cache 608.

Case 1: If no entry in the local cache 608 is detected, the HTTP URL checker 607 will allow the URL connection request to proceed.

Case 2: If there is a match in the local cache 608, the URL connection request is blocked.

In an embodiment, the response to the URL check is awaited while the DNS request will be allowed to pass if timeout. The agent 606 determines which computer device 610 and which IP address is related to the DNS request and the IP address may be blocked from outgoing traffic. Based on detecting that this specific computer device 610 and its associated DNS IP address has a negative verdict from the HTTP URL checker 607, then outgoing IP address may be blocked. For this, knowing a MAC address and an IP address is required. A table can be maintained having the IP address and the associated verdict from the URL check made. If the verdict is negative, then the blocking decision is made. Thus, blocking outgoing IP addresses based on received results from the HTTP URL checker 607 is enabled.

Figure 7A:
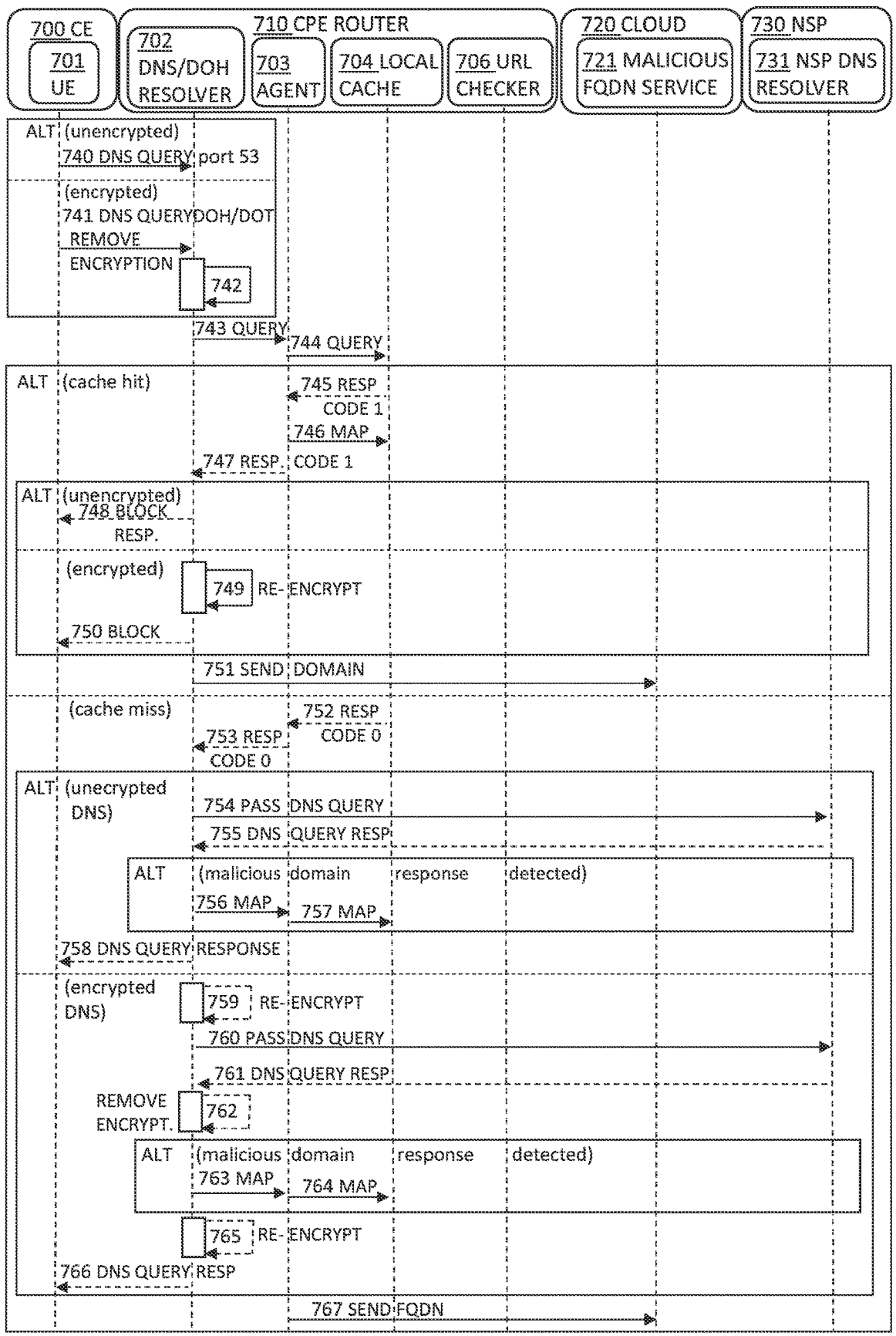
FIGS. 7A and 7B illustrate example process flows, according to an embodiment of the invention.
Figure 7B:
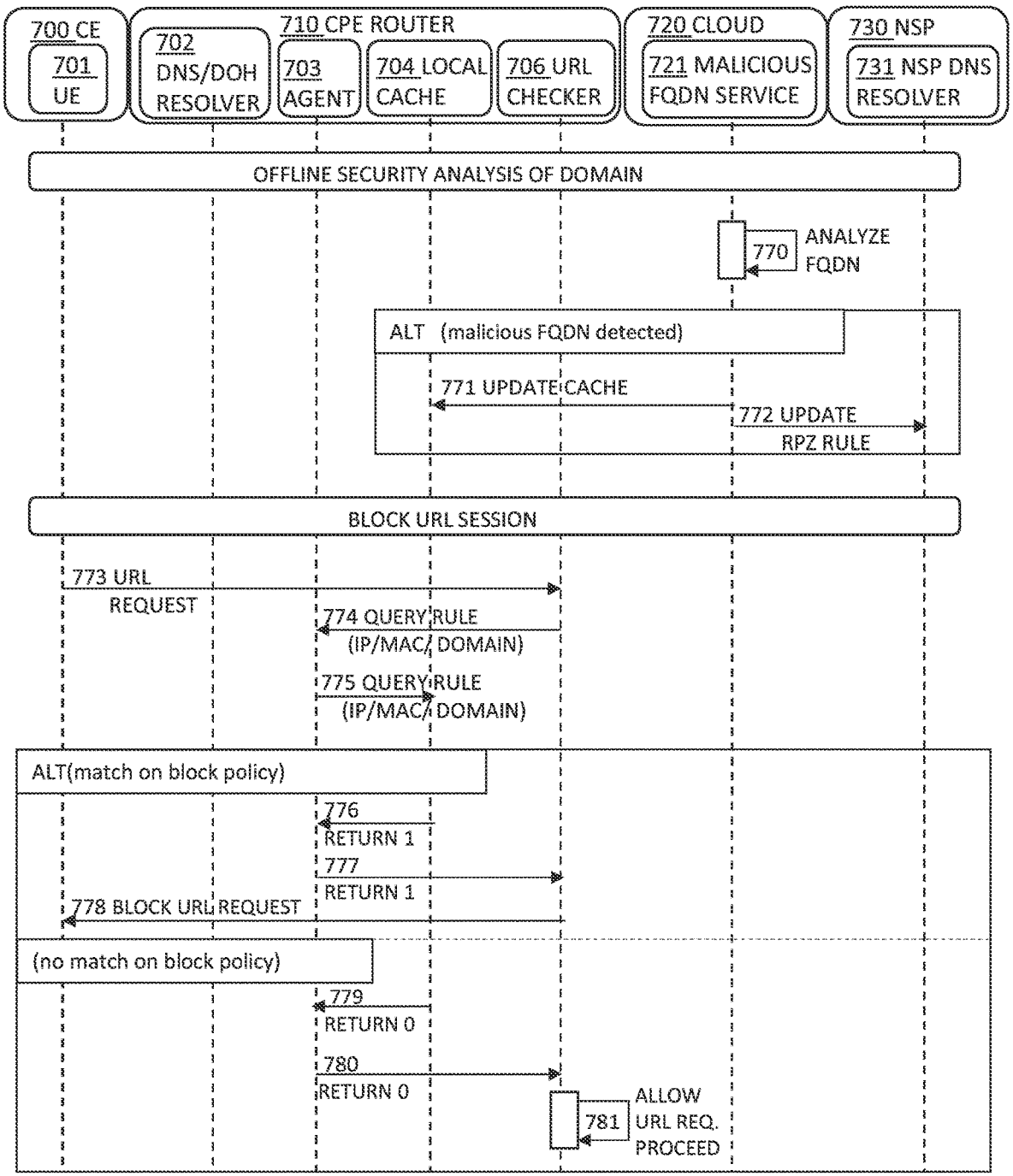

FIGS. 7A and 7B are signal sequence diagrams illustrating process flows according to an embodiment.

The steps, signaling messages, and related functions described in relation to FIGS. 7A and 7B are in no absolute chronological order, and some of the steps may be performed simultaneously or in a different order.

In steps 740 and 741, DNS query is sent from the user device 701 to a local DNS/DOH resolver 702 of a local router apparatus 710. In step 742, encryption is removed in case the DNS query was encrypted.

In steps 743 and 744, through a local agent 703, a local cache 704 is checked to determine whether the FQDN should be blocked.

If the cache entry exists, a desired block response is returned in steps 745 and 747 to the DNS/DOH resolver 702 via the local agent 703. Further, in step 746, the IP and MAC address of the user device 701 querying the blocked domain is logged and mapped to the local cache 704.

In steps 748 and 750, a block response is sent from the DNS/DOH resolver 702 to the user device 701. In case, the DNS query was encrypted, the block response is re-encrypted before returning the block response in step 749. In 751, the non-cached domain is sent to a malicious FQDN service 721 of a cloud service provider 720 for analysis.

If the cache entry does not exist, the DNS query is allowed to proceed. Associated response codes are sent to the DNS/DOH resolver 702 in steps 752, 753. Steps 754, 755, 758, 760, 761, and 766 illustrate passing the DNS queries from the DNS/DOH resolver 702 to the NSP DNS resolver 731 of a network service provider 730 and receiving responses to the DNS queries. If the DNS query from the user device 701 was encrypted, then the DNS query is re-encrypted before passing it to the NSP DNS resolver 731 in step 759. In that case, in 762, the DNS/DOH resolver 702 also removes encryption when receiving the response from the NSP DNS resolver 731 and then, in step 765, re-encrypts the DNS query response before sending it to the user device 701.

In steps 756, 757, 763 and 764, in case the response from the NSP DNS resolver 731 indicates that the domain is malicious, then the IP and MAC addresses of the user device 701 querying the blocked domain are logged and mapped to the local cache 704.

As shown above, the DNS query is allowed to proceed, however, the FQDN will also be sent for analysis to the malicious FQDN service 721 in step 767.

The example process continues in FIG. 7B where offline security analysis of the domain is illustrated by steps 770-772. The FQDN sent for domain analysis is analyzed in step 770. If the FQDN is determined to be suspicious, the local cache will be updated for all devices in step 771. In step 772, an RPZ rule is updated to NSP DNS resolver 506.

Steps 773-781 illustrate the process steps related to blocking an URL session. In step 773, the URL request is received by the URL checker 706 from the user device 701. The URL checker 706 queries the agent 703 about a rule indicating whether this specific user device 701 is allowed to connect to this domain in step 774. The agent 703 queries the local cache 704 in step 775.

In case a match on block policy is found, then the local cache 704 returns a response indicating this to the agent 703 in step 776 and the agent 703 returns the same to the URL checker 706 in step 777. In step 778, the URL checker 706 blocks the URL request.

In case no match on block policy is found, the local cache returns a response indicating this to the agent 703 in step 779 and the agent returns the response to the URL checker in step 780. In step 781, the URL checker allows the URL request to proceed.

The embodiments of the invention enable solving both DOH and SNI related problems. In an embodiment, if the reputation information is not cached, then the IP address is blocked. If the DNS query is then soon after repeated, the reputation information may already be cached. Any further client device may get the reputation directly from the DNS resolver device since it is already cached. In case of an unencrypted traffic, it is possible to block every SNI related to the same FQDN. When both envelopes are encrypted, the method can be used locally in the router apparatus by incorporating a DNS resolver and an agent device capable of caching and cloud reputation querying in the router device. When the DNS request process can be implemented locally in the local network, time is saved from the whole process. The reputation query can be held in the agent device and can be used immediately which is not the case when using the external network since there would be latency. The reputation service may be distributed in nature and implemented in the same locations where network service providers would offer DNS services.

In an embodiment, both the local network cache and a living connection are used based on knowing a device ID, the FQDN, the IP address and the reputation of the FQDN. All this information may be used when determining whether the outgoing connection needs to be blocked or not. Further, seeing behind network address translation (NAT) is enabled with this arrangement of having the DNS resolver in the local router.

In an embodiment, the FQDN reputation request is sent to the core in a primary flow and a response is expected as fast as it would from a corresponding request to the external network. The local cache may be used if the same request is received again. This reputation service thus responds as quickly as a traditional server would and the responses may be cached for the next requests. If the response is cached too late, the time to live (TTL) value may be set as desired (for example the same TTL may be used that has been set by the DNS resolver device). If the DNS resolver device does not have access to the requested reputation information, then the TTL may be set so short that another request is sent immediately. Thus, when there is no reputation information available, the requests may be sent repeatedly for as long as it is received. False positive risks are avoided by forcing the DNS request to be repeated until the FQDN reputation can be received from the local cache via the local agent.

The method thus enables solving FQDN reputation by the local DNS resolver and the agent device of the local router device. Further, for as long as the reputation information is received correctly, the IP address may be blocked. If no timeout for the reputation request is used, then the device may try again for as long as the response can be returned. If the cloud reputation returns an "unknown" reputation, then the cloud may start analysis of the FQDN reputation.

It will be appreciated that various modifications may be made to the above-described embodiments without departing from the scope of the present invention. For example, the database or analysis engine may be in separate entities to the apparatus, in which case the apparatus will send queries remotely to the analysis engine.

The steps, signaling messages, and related functions described above in relation to the figures are in no absolute chronological order, and some of the steps may be performed simultaneously or in a different order. Other functions may also be executed between the steps, and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases, or other digital information may be stored into memories and can include a processor-usable medium embodied in any computer program product which can contain, store, or maintain programming, data, or digital information for use by or in connection with an instruction execution system, such as the processor.

An embodiment provides a non-transitory computer-readable medium comprising stored program code comprised of computer-executable instructions. The computer program code comprises a code for implementing the process steps described above relating to FIGS. 7A and 7B.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

What is claimed is:

1. A method comprising:
   receiving an encrypted domain name system (DNS) query from a client computing device of a local computer network, wherein the DNS query is associated with a fully qualified domain name (FQDN);
   decrypting the encrypted DNS query for mapping the FQDN associated with the DNS query to a corresponding internet protocol (IP) address;
   requesting reputation information related to the FQDN from a local cache; in response to finding a matching FQDN in the local cache, blocking access of the client computing device to the FQDN; and
   in response to determining that a matching FQDN is not found in the local cache:

allowing the DNS query to proceed from the local computer network to a cloud DNS resolver of a network service provider;

in response to receiving a response from the cloud DNS resolver, logging and mapping the IP address and a medium access control (MAC) address of the client computing device to the local cache;

requesting the reputation information related to the FQDN from a cloud FQDN server; and in response to receiving the reputation information from the cloud FQDN server indicating that the FQDN should be blocked, updating the local cache with the reputation information related to the FQDN to indicate that further queries to the FQDN are to be blocked.

2. The method according to claim 1, further comprising in response to finding a matching FQDN in the local cache, logging and mapping the IP address and the MAC address of the client computing device to the local cache and blocking access of the client computing device to the FQDN.

3. The method according to claim 1, further comprising blocking one or more outbound IP addresses of the client computing device based on the reputation information related to the FQDN.

4. The method according to claim 1, further comprising blocking access of a further client computing device to the FQDN based on the reputation information related to the FQDN in response to receiving a further DNS query to the same FQDN in the local cache.

5. The method according to claim 1, further comprising re-encrypting the DNS query before passing the DNS query to the cloud DNS resolver.

6. The method according to claim 1, further comprising sending a response to the DNS query to the client computing device.

7. The method according to claim 1, further comprising determining a device identification of the client computing device and controlling the access of the client computing device to the FQDN based on the device identification.

8. The method according to claim 1, wherein DNS resolution is performed via hypertext transfer protocol (HTTPS) or transport layer security (TLS).

9. The method according to claim 1, further comprising setting a predetermined time to live (TTL) for caching the DNS query before causing the client computing device to resend the DNS query in case the reputation information from the cloud FQDN server has not been received.

10. The method according to claim 1, further comprising taking further action to protect one or more client computing devices of the local computer network, wherein the further action comprises one or more of: reporting a security-related incident; blocking or preventing access to the FQDN; preventing communication of the client computing device; providing security, parental control, or privacy protection measures and applying other security measures to protect the local computer network and/or the one or more client computing devices.

11. The method according to claim 1, further comprising:

receiving a URL connection request requesting a URL connection from the client computing device;

querying whether the client computing device is allowed to connect to a resource related to a URL of the URL connection request; and in response to finding reputation information indicating that the client computing device is not allowed to connect to the resource related to the URL in the local cache, blocking the URL connection request.

12. The method according to claim 11, further comprising in response to determining that the reputation information is not found in the local cache, allowing the URL connection request to proceed.

13. The method according to claim 11, further comprising allowing the DNS query to proceed to the cloud DNS resolver of the network service provider before receiving a response related to the DNS query.

14. The method according to claim 11, further comprising blocking the requested URL connection until the response related to the DNS query is received.

15. The method according to claim 14 wherein blocking the URL connection is further based on a device identification of the client computing device.

16. An apparatus in a local computer network comprising one or more processor devices, the one or more processor devices comprising one or more memories and configured to:

receive an encrypted domain name system (DNS) query from a client computing device of the local computer network, wherein the DNS query is associated with a fully qualified domain name (FQDN);

decrypt the encrypted DNS query for mapping the FQDN associated with the DNS query to a corresponding internet protocol (IP) address;

request reputation information related to the FQDN from a local cache; in response to finding a matching FQDN in the local cache, block access of the client computing device to the FQDN; and in response to determining that the matching FQDN is not found in the local cache, the one or more processor devices are further configured to:

allow the DNS query to proceed from the local computer network to a cloud DNS resolver of a network service provider;

log and map the IP address and a medium access control (MAC) address of the client computing device to the local cache in response to receiving a response from the cloud DNS resolver;

request the reputation information related to the FQDN from a cloud FQDN server; and update the local cache with the reputation information related to the FQDN to indicate that further queries to the FQDN are to be blocked in response to receiving the reputation information indicating that the FQDN should be blocked from the cloud FQDN server.

17. The apparatus according to claim 16, the one or more processor devices being further configured to log and map the IP address and the MAC address of the client computing device to the local cache, and block access of the client computing device to the FQDN in response to finding a matching FQDN in the local cache.

18. The apparatus according to claim 16, the one or more processor devices being further configured to:

receive a uniform resource locator (URL) connection request requesting a URL connection from the client computing device;

determine whether the client computing device is allowed to connect to a resource related to a URL based on reputation information in the local cache of the local computer network;

block the URL connection request in response to determining that the reputation information indicates that the client computing device is not allowed to connect to the resource related to the URL in the local cache; and allow the URL connection request to proceed in response to determining that the reputation information is not found in the local database.

19. The apparatus according to claim 18, the one or more processor devices being further configured to allow the DNS query to proceed to the cloud DNS resolver of the network service provider before determining whether the client computing device is allowed to connect to the resource related to the URL.

20. The apparatus according to claim 18, the one or more processor devices being further configured to block the requested URL connection before determining whether the client computing device is allowed to connect to the resource related to the URL.

21. A non-transitory computer-readable medium comprising stored program code, the program code comprised of computer-executable instructions that, when executed by a processor, cause one or more processor devices to:
  receive an encrypted domain name system (DNS) query from a client computing device of the local computer network, wherein the DNS query is associated with a fully qualified domain name (FQDN);
  decrypt the encrypted DNS query for mapping the FQDN associated with the DNS query to a corresponding internet protocol (IP) address;
  request reputation information related to the FQDN from a local cache; in response to finding a matching FQDN in the local cache, block access of the client computing device to the FQDN; and
  in response to determining that a matching FQDN is not found in the local cache, the one or more processor devices are further configured to:
    allow the DNS query to proceed from the local computer network to a cloud DNS resolver of a network service provider;
    log and map the IP address and a medium access control (MAC) address of the client computing device to the local cache in response to receiving a response from the cloud DNS resolver;
    request the reputation information related to the FQDN from a cloud FQDN server; and
    update the local cache with the reputation information related to the FQDN to indicate that further queries to the FQDN are to be blocked in response to receiving the reputation information indicating that the FQDN should be blocked from the cloud FQDN server.

* * * * *